(12) United States Patent
Deng et al.

(10) Patent No.: US 10,334,117 B2
(45) Date of Patent: Jun. 25, 2019

(54) METHOD AND APPARATUS FOR MODIFYING CHARGING MODE, MOBILE TERMINAL, AND NETWORK SIDE DEVICE

(71) Applicant: SPREADTRUM COMMUNICATIONS (SHANGHAI) CO., LTD., Zhangjiang, Shanghai (CN)

(72) Inventors: Yun Deng, Shanghai (CN); Xichun Gao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/805,562

(22) Filed: Nov. 7, 2017

(65) Prior Publication Data

US 2018/0176391 A1    Jun. 21, 2018

(30) Foreign Application Priority Data

Dec. 16, 2016   (CN) .......................... 2016 1 1173952

(51) Int. Cl.
| | |
|---|---|
| *H04M 11/00* | (2006.01) |
| *H04M 15/00* | (2006.01) |
| *H04L 29/06* | (2006.01) |
| *H04W 4/24* | (2018.01) |

(52) U.S. Cl.
CPC .... *H04M 15/8022* (2013.01); *H04L 65/1006* (2013.01); *H04L 65/1083* (2013.01); *H04M 15/07* (2013.01); *H04M 15/39* (2013.01); *H04M 15/63* (2013.01); *H04M 15/81* (2013.01); *H04M 15/83* (2013.01); *H04W 4/24* (2013.01)

(58) Field of Classification Search
CPC .................................................. H04M 15/8022
See application file for complete search history.

(56) References Cited

U.S. PATENT DOCUMENTS

| | | | | |
|---|---|---|---|---|
| 2014/0171033 A1* | 6/2014 | Cili | .......................... | H04W 4/16 455/414.1 |
| 2015/0138987 A1* | 5/2015 | Lee | ........................ | H04W 40/34 370/238 |

* cited by examiner

*Primary Examiner* — Justin Y Lee
(74) *Attorney, Agent, or Firm* — Cantor Colburn LLP (57) ABSTRACT

A method and an apparatus for modifying a charging mode, a mobile terminal and a network side device are provided in the present disclosure. The method includes: transmitting a signaling message containing information of modifying roles of current calling and called parties or modifying a charging mode to a network side, after receiving a signaling message containing calling information; and receiving a signaling message transmitted by the network side that contains information that the roles of the current calling and called parties are modified, or the charging mode is modified. In the present disclosure, calling and called parties can be modified in real time through network, which is convenient to operate, and can save network signaling overhead and can avoid a current call being interrupted by the network side due to insufficient tariffs of a current calling party.

10 Claims, 5 Drawing Sheets

--- transmitting a signaling message containing information of modifying roles of current calling and called parties or modifying a charging mode to a network side, after receiving a signaling message containing calling information — S11

↓ receiving a signaling message transmitted by the network side that contains information that the roles of the current calling and called parties are modified, or the charging mode is modified — S12

METHOD AND APPARATUS FOR MODIFYING CHARGING MODE, MOBILE TERMINAL, AND NETWORK SIDE DEVICE

CROSS-REFERENCE TO RELATED APPLICATIONS

The present invention claims priority under 35 U.S.C. § 119 to Chinese Patent Application No. 201611173952.9, filed on Dec. 16, 2016, the entire content of which is incorporated herein by reference.

TECHNICAL FIELD

The present disclosure relates to communication technology field, and more particularly, to a method and an apparatus for modifying a charging mode, a mobile terminal, and a network side device.

BACKGROUND

Both parties involved in a call include a calling party and a called party. After the calling party initiates a call request, the called party is paged through network. After a channel for transmitting a voice packet is established, the calling party and the called party may start a call. Generally, cost of the call is paid or mainly paid by the calling party, the network can identify the calling party and the called party, and charge the calling party according to the traffic or talk time, and the called party may not need to pay cost or only need to pay less.

In real life, there is a scene that the calling party needs to call the called party, while the calling party can afford limited cost and the called party can provide sufficient tariffs. If the current call continues, the network may interrupt the current call due to tariff problems of the calling party; and if the two parties of the call expect to continue the call, one of the calling party and the called party needs to take the initiative to hang up, and then the previous called party starts a call as a calling party, and pages the previous calling party, after establishing a channel for transmitting voice data packets, the two parties re-engage the call, which makes user experience of both parties uncomfortable.

In a conventional technology, a current call needs to be terminated firstly, and then roles of calling and called parties need to be modified to re-establish a new call, which makes operation complicated. In addition, signaling overhead is large for a network and user experience of both parties of the call is not comfortable.

SUMMARY

A method and an apparatus for modifying a charging mode, a mobile terminal and a network side device are provided according to embodiments of the present disclosure. Calling and called parties can be modified in real time through network, which is convenient to operate, and can save network signaling overhead and can avoid a current call being interrupted by the network side due to insufficient tariffs of a current calling party.

A method for modifying a charging mode that is adapted to a called mobile terminal is provided according to embodiments of the present disclosure. The method may include: transmitting a signaling message containing information of modifying roles of current calling and called parties or modifying a charging mode to a network side, after receiving a signaling message containing calling information; and receiving a signaling message transmitted by the network side that contains information that the roles of the current calling and called parties are modified, or the charging mode is modified.

Optionally, the method further may include receiving a request message from the network side for modifying roles of calling and called parties or modifying a charging mode, before transmitting the signaling message containing information of modifying the roles of the current calling and called parties or modifying the charging mode to the network side.

Optionally, the signaling message or the request message may be a Session Initiation Protocol (SIP) signaling message or a Non-Access Stratum (NAS) signaling message.

A method for modifying a charging mode that is adapted to a network side device is also provided according to embodiments of the present disclosure. The method may include: receiving a signaling message transmitted by a called mobile terminal that contains information of modifying roles of current calling and called parties or modifying a charging mode; and setting the current calling party as a new called party and setting the current called party as a new calling party, or charging the current calling party as a called role and charging the current called party as a calling role; and transmitting a signaling message containing information that the roles of the current calling and called parties are modified or the charging mode is modified to the called mobile terminal.

Optionally, the method may further include transmitting a request message to the called mobile terminal for modifying roles of calling and called parties or modifying a charging mode, before receiving the signaling message transmitted by the called mobile terminal that contains information of modifying the roles of the current calling and called parties or modifying the charging mode.

Optionally, the signaling message or the request message may be a Session Initiation Protocol (SIP) signaling message or a Non-Access Stratum (NAS) signaling message.

An apparatus for modifying a charging mode that is located at a called mobile terminal is also provided according to embodiments of the present disclosure. The apparatus may include: a first transmitting circuitry, configured to transmit a signaling message containing information of modifying roles of current calling and called parties or modifying a charging mode to a network side, after receiving a signaling message containing calling information; and a first receiving circuitry, configured to receive a signaling message transmitted by the network side that contains information that the roles of the current calling and called parties are modified, or the charging mode is modified.

Optionally, the apparatus may further include a second receiving circuitry, which is configured to receive a request message from the network side for modifying roles of calling and called parties or modifying a charging mode, before the first transmitting circuitry transmits the signaling message containing information of modifying roles of the current calling and called parties or modifying the charging mode to the network side.

Optionally, the signaling message or the request message may be a Session Initiation Protocol (SIP) signaling message or a Non-Access Stratum (NAS) signaling message.

An apparatus for modifying a charging mode that is located at a network side device is also provided according to embodiments of the present disclosure. The apparatus may include: a third receiving circuitry, configured to receive a signaling message transmitted by a called mobile terminal that contains information of modifying roles of current calling and called parties or modifying a charging mode; a processing circuitry, configured to set the current calling party as a new called party and setting the current called party as a new calling party, or charge the current calling party as the called role and charge the current called party as the calling role; and a second transmitting circuitry, configured to transmit a signaling message containing information that the roles of the current calling and called parties are modified or the charging mode is modified to the called mobile terminal.

Optionally, the apparatus may further include a third transmitting circuitry, which is configured to transmit a request message to the called mobile terminal for modifying roles of calling and called parties or modifying a charging mode, before the third receiving circuitry receives the signaling message transmitted by the called mobile terminal that contains information of modifying the roles of the current calling and called parties or modifying the charging mode.

Optionally, the signaling message or the request message may be a Session Initiation Protocol (SIP) signaling message or a Non-Access Stratum (NAS) signaling message.

A mobile terminal including the aforementioned apparatus for modifying a charging mode that is located at a called mobile terminal is also provided according to embodiments of the present disclosure. The apparatus may include: a first transmitting circuitry, configured to transmit a signaling message containing information of modifying roles of current calling and called parties or modifying a charging mode to a network side, after receiving a signaling message containing calling information; and a first receiving circuitry, configured to receive a signaling message transmitted by the network side that contains information that the roles of the current calling and called parties are modified, or the charging mode is modified.

A network side device including the aforementioned apparatus for modifying a charging mode that is located at a network side device is also provided according to embodiments of the present disclosure. The apparatus may include: a third receiving circuitry, configured to receive a signaling message transmitted by a called mobile terminal that contains information of modifying roles of current calling and called parties or modifying a charging mode; a processing circuitry, configured to set the current calling party as a new called party and setting the current called party as a new calling party, or charge the current calling party as the called role and charge the current called party as the calling role; and a second transmitting circuitry, configured to transmit a signaling message containing information that the roles of the current calling and called parties are modified or the charging mode is modified to the called mobile terminal.

In the method and apparatus for modifying a charging mode, the mobile terminal and the network side device according to the embodiments of the present disclosure, after the calling information is learned, information of modifying roles of the calling and called parties or modifying the charging mode is transmitted to the network side through a signaling message, and when the network side modifies the roles of the calling and called parties or modifies the charging method, the network element responsible for charging is notified to charge in accordance with the new calling and called parties. Compared with the prior art, the calling and called parties can be modified in real time through network in the present disclosure, which is convenient to operate, and can save the network signaling overhead and can avoid the current call being interrupted by the network side due to insufficient tariffs of the current calling party.

DETAILED DESCRIPTION

In order to make the above-mentioned objects, features and advantages of the present disclosure more easily understood, specific embodiments of the present disclosure will be described in detail with reference to the accompanying drawings below. Apparently, embodiments described below are merely a portion of embodiments of the present disclosure, and are not all embodiments. All other embodiments obtained by those of ordinary skill in the art without making creative work are within the scope of the present disclosure, based on embodiments disclosed hereinafter.

Figure 1:
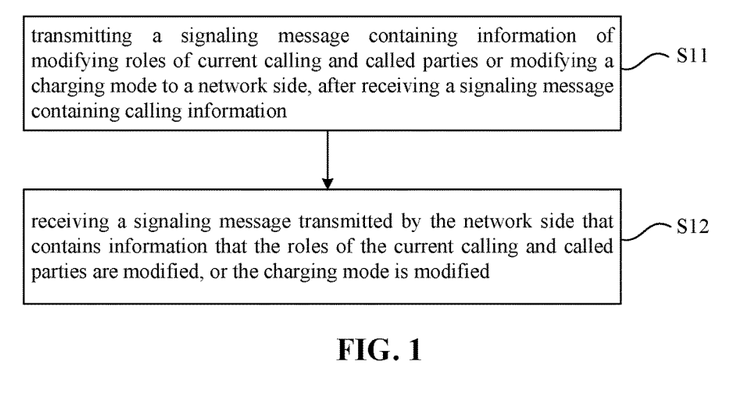
FIG. 1 schematically illustrates a flow chart of a method for modifying a charging mode according to an embodiment of the present disclosure.

A method for modifying a charging mode that is adapted to a called mobile terminal is provided according to embodiments. Referring to FIG. 1, the method may include S11 and S12.

In S11, after a signaling message containing calling information is received, a signaling message containing information of modifying roles of current calling and called parties or modifying a charging mode is transmitted to a network side.

In S12, a signaling message transmitted by the network side is received, where the signaling message contains information that the roles of the current calling and called parties are modified, or the charging mode is modified.

Figure 2:
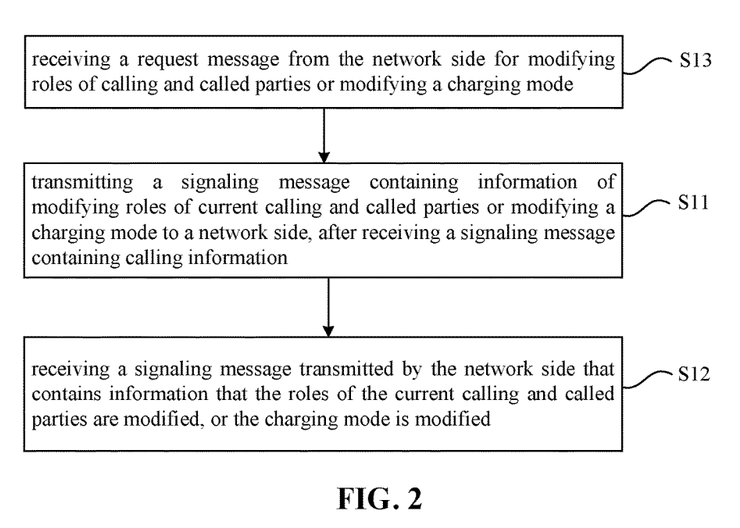
FIG. 2 schematically illustrates a flow chart of a method for modifying a charging mode according to another embodiment of the present disclosure.

Referring to FIG. 2, in some embodiments, the method may further include S13 prior to the aforementioned S11. That is, the method may further include receiving a request message from the network side for modifying roles of calling and called parties or modifying a charging mode in S13, before transmitting the signaling message containing information of modifying the roles of the current calling and called parties or modifying the charging mode to the network side in S11.

Figure 3:
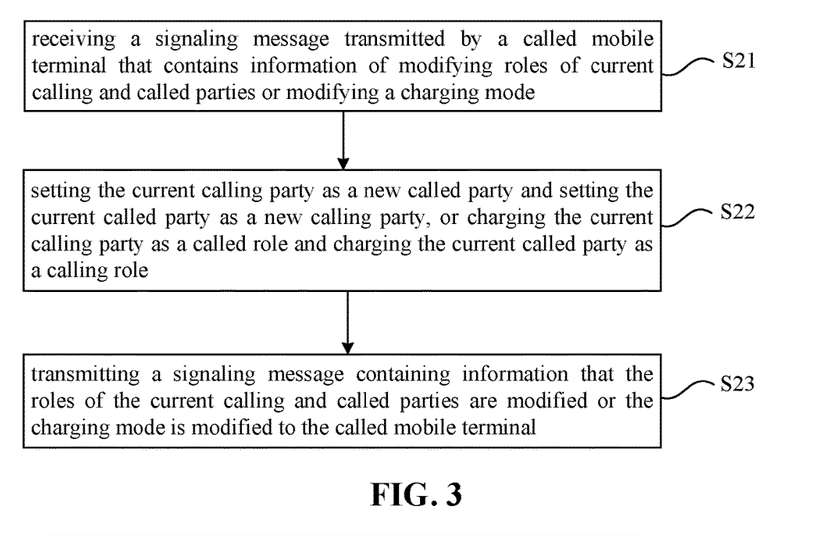
FIG. 3 schematically illustrates a flow chart of a method for modifying a charging mode according to another embodiment of the present disclosure.

A method for modifying a charging mode that is adapted to a network side device is also provided according to embodiments. Referring to FIG. 3, the method may include S21, S22 and S23.

In S21, a signaling message transmitted by a called mobile terminal that contains information of modifying roles of current calling and called parties or modifying a charging mode is received.

In S22, the current calling party is set as a new called party and the current called party is set as a new calling party, or the current calling party is charged as a called role and the current called party is charged as a calling role.

In S23, a signaling message containing information that the roles of the current calling and called parties are modified or the charging mode is modified, is transmitted to the called mobile terminal.

Figure 4:
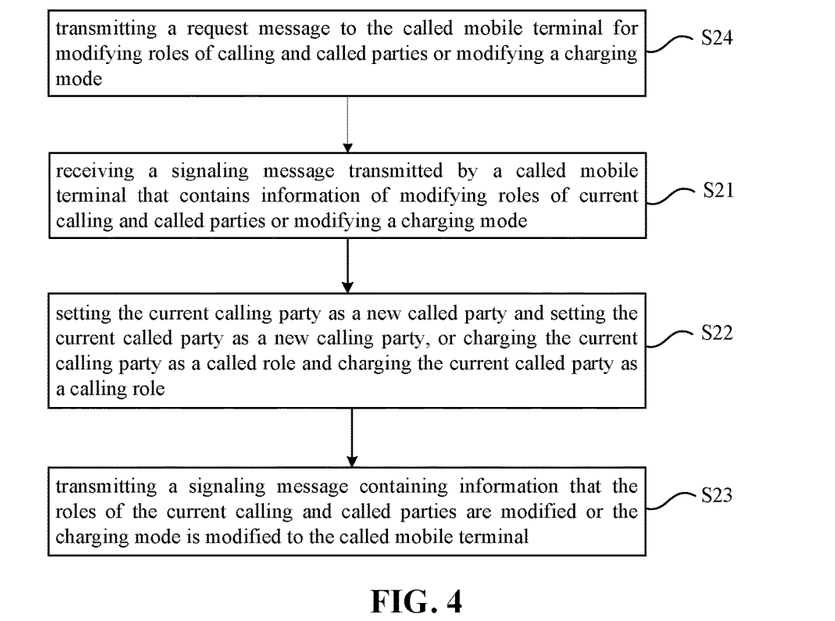
FIG. 4 schematically illustrates a flow chart of a method for modifying a charging mode according to another embodiment of the present disclosure.

Referring to FIG. 4, in some embodiments, the method may further include S24 prior to the aforementioned S21. That is, the method may further include transmitting a request message to the called mobile terminal for modifying roles of calling and called parties or modifying a charging mode in S24, before receiving the signaling message transmitted by the called mobile terminal that contains information of modifying the roles of the current calling and called parties or modifying the charging mode in S21.

Specifically, after the called mobile terminal receives a paging message transmitted by a base station, a Radio Resource Control (RRC) connection is started, and when the RRC connection is established, a service request message is sent to the base station, then the base station is reconfigured via the RRC connection, and establishes data wireless bearer with the called mobile terminal, thereby the service being established. Then, a core network sends the signaling message including the calling information to the called mobile terminal through the base station, so that the called mobile terminal can learn the calling information.

In some embodiments, after the service is established, the network side device may charge two parties of a call based on an existing charging policy, and then if a calling party does not have enough tariffs, a request for modifying roles of the calling and called parties or modifying a charging mode may be transmitted to the called mobile terminal, before the current call is terminated. If the current called party agrees to modify the roles of the calling and calling parties or to modify the charging mode, the called party mobile terminal may transmit a signaling message containing information of modifying the roles of the current calling and called parties or modifying the charging mode to the network side, so as to maintain the current call continuously. Therefore, the call being interrupted by the network side due to tariff problems of the current calling party can be avoid.

In some embodiments, if the established service is an IP Multimedia Subsystem (IMS) service, after receiving a Session Initiation Protocol (SIP) signaling message containing calling information, the called mobile terminal may learn the calling information, and if the called mobile terminal desires to switch a role with a calling party or to modify a charging mode, the called mobile terminal may send a signaling message containing information of modifying roles of current calling and called parties or modifying a charging mode, to notify the network side to modify the current calling and called parties or to modify the charging mode, for example, to notify a Serving-Call Session Control Function (S-CSCF) to modify the roles of the current calling and called parties. Specifically, the method may include the following steps.

A head field, a header field value or a method field of a SIP signaling message is expanded, so that the SIP signaling message can include information of modifying roles of current calling and called parties or modifying a charging method; and the SIP signaling message is transmitted to the network side.

If the S-CSCF network allows to modify the calling and called parties or to modify the charging mode, the S-CSCF network will inform Policy and Charging Rule Function (PCRF) to charge according to new calling and called parties, that is, the current calling party is charged as a called role and the current called party is charged as a calling role.

After modifying the roles of the calling and called parties, the network side may transmit an SIP signaling message containing information that roles of current calling and called parties are modified or a charging mode is modified, to the called mobile terminal.

In some embodiments, if the established service is a non-IMS service, after receiving a Non-Access Stratum (NAS) signaling message containing calling information, a called mobile terminal learns the calling information, and if the called mobile terminal desires to switch a role with a calling party, the called mobile terminal may send an NAS signaling message containing information of modifying roles of current calling and called parties or modifying a charging mode, to notify the network side to modify the roles of the current calling and called parties or to modify the charging mode, for example, an Mobility Management Entity (MME) that can decode the NAS signaling, may transmit information to PCRF (i.e. network element responsible for charging) through S-GW (Serving GateWay) and P-GW (PDN GateWay) after acquiring information of modifying roles of calling and called parties or modifying a charging mode. Specifically, the method may include the following steps.

A cell containing information of modifying roles of current calling and called parties or modifying a charging mode is added to an NAS signaling message; and the NAS signaling message is transmitted to a network side.

The PCRF will modify roles of the calling and called parties or modify the charging mode, set the current called mobile terminal as a new calling party, and set the current calling mobile terminal as a new called party, or charge the current called mobile terminal as a calling role and charge the current calling mobile terminal as a called role.

After modifying roles of the calling and called parties, the network side will send an NAS signaling message to the called mobile terminal which contains information that roles of the current calling and called parties are modified or the charging mode is modified.

In the method for modifying a charging mode according to the embodiments of the present disclosure, after the calling information is learned, information of modifying roles of the calling and called parties or modifying the charging mode is transmitted to the network side through a signaling message, and when the network side modifies the roles of the calling and called parties or modifies the charging method, the network element responsible for charging is notified to charge in accordance with the new calling and called parties. Compared with the prior art, the calling and called parties can be modified in real time through network with the method in the present disclosure, which is convenient to operate, and can save the network signaling overhead and can avoid the current call being interrupted by the network side due to insufficient tariffs of the current calling party.

Figure 5:
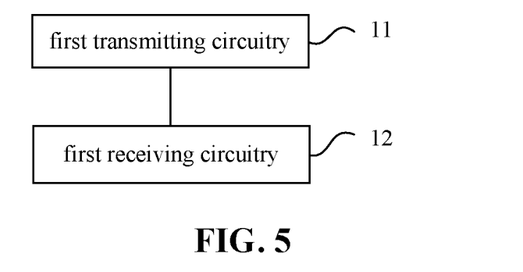
FIG. 5 schematically illustrates a structural diagram of an apparatus for modifying a charging mode according to an embodiment of the present disclosure.

An apparatus for modifying a charging mode which is located at a called mobile terminal is also provided according to embodiments of the present disclosure. Referring to FIG. 5, the apparatus may include a first transmitting circuitry 11 and a first receiving circuitry 12.

The first transmitting circuitry 11 is configured to transmit a signaling message containing information of modifying roles of current calling and called parties or modifying a charging mode to a network side, after receiving a signaling message containing calling information.

The first receiving circuitry 12 is configured to receive a signaling message transmitted by the network side that contains information that the roles of the current calling and called parties are modified, or the charging mode is modified.

Figure 6:
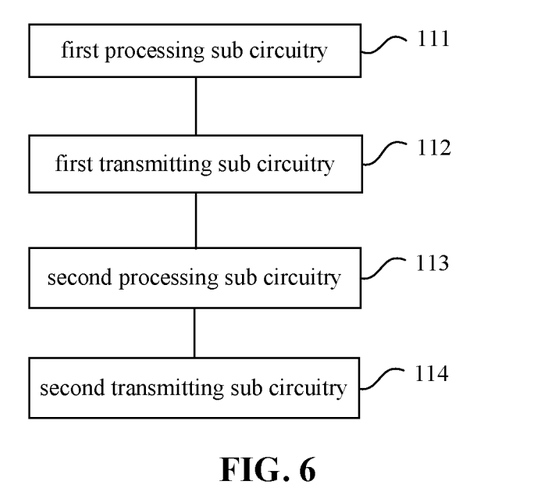
FIG. 6 schematically illustrates a structural diagram of a first transmitting circuitry of an apparatus for modifying a charging mode according to an embodiment of the present disclosure.

Referring to FIG. 6, in some embodiments, for an IP Multimedia Subsystem (IMS) service, the first transmitting circuitry 11 may include a first processing sub circuitry 111 and a first transmitting sub circuitry 112.

The first processing sub circuitry 111 is configured to expand a header field, a header field cell value or a method of an SIP signaling message, so that the SIP signaling message can include information of modifying roles of current calling and called parties or modifying a charging method.

The first transmitting sub circuitry 112 is configured to transmit the SIP signaling message processed by the first processing sub circuitry 111 to the network side.

Referring to FIG. 6, in some embodiments, for a non-IMS service, the first transmitting circuitry 11 may include a second processing sub circuitry 113 and a second transmitting sub circuitry 114.

The second processing sub circuitry 113 is configured to add a cell containing information of modifying roles of current calling and called parties or modifying a charging mode to a Non-Access Stratum (NAS) signaling message.

The second transmitting sub circuitry 114 is configured to transmitting the NAS signaling message processed by the second processing sub circuitry 113 to the network side.

Figure 7:
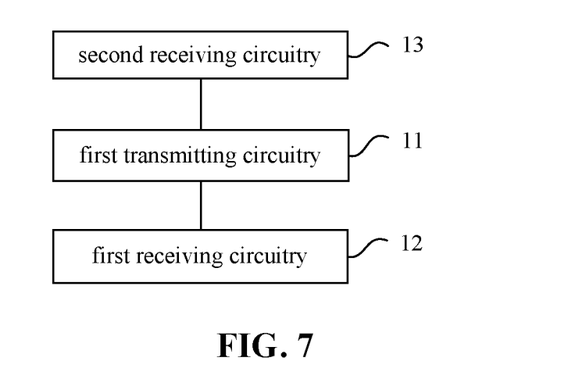
FIG. 7 schematically illustrates a structural diagram of an apparatus for modifying a charging mode according to another embodiment of the present disclosure.

Referring to FIG. 7, in some embodiments, the apparatus may further include a second receiving circuitry 13, which is configured to receive a request message from the network side for modifying roles of calling and called parties or modifying a charging mode, before the first transmitting circuitry 11 transmits the signaling message containing information of modifying roles of the current calling and called parties or modifying the charging mode to the network side.

Figure 8:
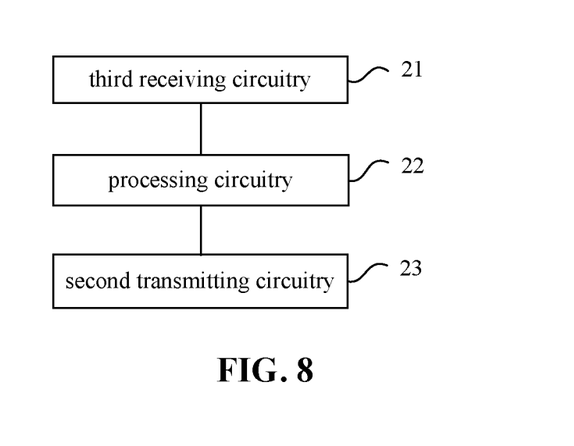
FIG. 8 schematically illustrates a structural diagram of an apparatus for modifying a charging mode according to another embodiment of the present disclosure.

An apparatus for modifying a charging mode which is located at a network side device is also provided according to embodiments of the present disclosure. Referring to FIG. 8, the apparatus may include a third receiving circuitry 21, a processing circuitry 22 and a second transmitting circuitry 23.

The third receiving circuitry 21 is configured to receive a signaling message transmitted by a called mobile terminal that contains information of modifying roles of current calling and called parties or modifying a charging mode.

The processing circuitry 22 is configured to set the current calling party as a new called party and setting the current called party as a new calling party, or to charge the current calling party as a called role and to charge the current called party as a calling role.

The second transmitting circuitry 23 is configured to transmit a signaling message containing information that the roles of the current calling and called parties are modified or the charging mode is modified to the called mobile terminal.

Figure 9:
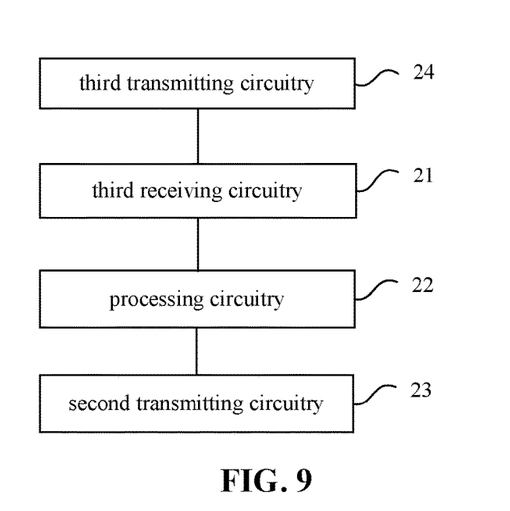
FIG. 9 schematically illustrates a structural diagram of an apparatus for modifying a charging mode according to another embodiment of the present disclosure.

Referring to FIG. 9, in some embodiments, the apparatus may further include a third transmitting circuitry 24.

The third transmitting unit 24 is configured to transmit a request message to the called mobile terminal for modifying roles of calling and called parties or modifying a charging mode, before the third receiving circuitry 21 receives the signaling message transmitted by the called mobile terminal that contains information of modifying the roles of the current calling and called parties or modifying the charging mode.

In the apparatus for modifying a charging mode according to the embodiments of the present disclosure, after the calling information is learned, information of modifying roles of the calling and called parties or modifying the charging mode is transmitted to the network side through a signaling message, and when the network side modifies the roles of the calling and called parties or modifies the charging method, the network element responsible for charging is notified to charge in accordance with the new calling and called parties. Compared with the prior art, the calling and called parties can be modified in real time through network with the method in the present disclosure, which is convenient to operate, and can save the network signaling overhead and can avoid the current call being interrupted by the network side due to insufficient tariffs of the current calling party.

A mobile terminal is also provided according to embodiments of the present disclosure. The mobile terminal may include the aforementioned apparatus for modifying a charging mode that is located at a called mobile terminal. The apparatus may include: a first transmitting circuitry, configured to transmit a signaling message containing information of modifying roles of current calling and called parties or modifying a charging mode to a network side, after receiving a signaling message containing calling information; and a first receiving circuitry, configured to receive a signaling message transmitted by the network side that contains information that the roles of the current calling and called parties are modified, or the charging mode is modified.

A network side device is also provided according to embodiments of the present disclosure. The network side device may include the aforementioned apparatus for modifying a charging mode that is located at a network side device. The apparatus may include: a third receiving circuitry, configured to receive a signaling message transmitted by a called mobile terminal that contains information of modifying roles of current calling and called parties or modifying a charging mode; a processing circuitry, configured to set the current calling party as a new called party and setting the current called party as a new calling party, or charge the current calling party as the called role and charge the current called party as the calling role; and a second transmitting circuitry, configured to transmit a signaling message containing information that the roles of the current calling and called parties are modified or the charging mode is modified to the called mobile terminal.

It will be understood by those of ordinary skill in the art that all or part of the processes in the method of the embodiments described above may be implemented by means of a computer program commanding associated hardware, where the computer program may be stored in a computer-readable storage medium. During execution of the program, procedures of embodiments as described above may be included. The storage medium may be a magnetic disk, an optical disk, a read-only memory (ROM), a random access memory (RAM), or the like.

Although the present disclosure has been described above, the present disclosure is not limited thereto. It should be understood by those skilled in the art that various changes and modifications may be made without departing from the spirit and scope of the disclosure, and therefore, the scope of the disclosure should be limited by the scope of the claims.

What is claimed is:

1. A method for modifying a charging mode, adapted to a called mobile terminal, comprising:
    transmitting a signaling message containing information of modifying a charging mode to a network side, after receiving a signaling message containing calling information; and
    receiving a signaling message transmitted by the network side that contains information that the charging mode is modified, wherein the modified charging mode comprises that a current calling party is charged as a called role and a current called party is charged as a calling role;
    wherein the signaling message is a Session Initiation Protocol (SIP) signaling message, transmitting the signaling message containing information of modifying the charging mode to the network side comprises:
    expanding a head field, a header field value or a method field of the SIP signaling message, so that the SIP signaling message comprises information of modifying the charging method; and
    transmitting the SIP signaling message to the network side;
    wherein transmitting the SIP signaling message to the network side comprises: transmitting the SIP signaling message containing the information of modifying the charging mode to a Serving-Call Session Control Function (S-CSCF) entity of the network side.

2. The method according to claim 1, further comprising: receiving a request message from the network side for modifying the charging mode, before transmitting the signaling message containing information of modifying the charging mode to the network side.

3. The method according to claim 2, wherein the request message is an SIP signaling message.

4. A method for modifying a charging mode, adapted to a network side device, comprising:
    receiving a signaling message transmitted by a called mobile terminal that contains information of modifying a charging mode; and
    charging the current calling party as a called role and charging the current called party as a calling role; and
    transmitting a signaling message containing information that the charging mode is modified to the called mobile terminal;
    wherein the signaling message is a Session Initiation Protocol (SIP) signaling message, charging the current calling party as a called role and charging the current called party as a calling role comprises:
    informing a policy and Charging Rule Function (PCRF) entity to charge the current calling party as a called role and charge the current called party as a calling role via a Serving-Call Session Control Function (S-CSCF) entity.

5. The method according to claim 4, further comprising: transmitting a request message to the called mobile terminal for modifying the charging mode, before receiving the signaling message transmitted by the called mobile terminal that contains information of modifying the charging mode.

6. The method according to claim 5, wherein the request message is an SIP signaling message.

7. An apparatus for modifying a charging mode, located at a called mobile terminal, comprising:
    a first transmitting circuitry, configured to transmit a signaling message containing information of modifying a charging mode to a network side, after receiving a signaling message containing calling information; and
    a first receiving circuitry, configured to receive a signaling message transmitted by the network side that contains information that the charging mode is modified, wherein the modified charging mode comprises that a current calling party is charged as a called role and a current called party is charged as a calling role;
    wherein the signaling message is a Session Initiation Protocol (SIP) signaling message, the first transmitting circuitry comprises:
    a first processing sub circuitry, configured to expand a header field, a header field value or a method of the SIP signaling message, so that the SIP signaling message comprises information of modifying the charging method; and
    a first transmitting sub circuitry, configured to transmit the SIP signaling message processed by the first processing sub circuitry to the network side.

8. The apparatus according to claim 7, further comprising:
    a second receiving circuitry, configured to receive a request message from the network side for modifying the charging mode, before the first transmitting circuitry transmits the signaling message containing information of modifying the charging mode to the network side.

9. The apparatus according to claim 8, wherein the request message is an SIP signaling message.

10. A mobile terminal, comprising:
    an apparatus for modifying a charging mode, located at a called mobile terminal;
    wherein the apparatus for modifying a charging mode comprises: a first transmitting circuitry, configured to transmit a signaling message containing information of modifying a charging mode to a network side, after receiving a signaling message containing calling information; and a first receiving circuitry, configured to receive a signaling message transmitted by the network side that contains information that the charging mode is modified, wherein the modified charging mode comprises that a current calling party is charged as a called role and a current called party is charged as a calling role;
    wherein the signaling message is a Session Initiation Protocol (SIP) signaling message, the first transmitting circuitry comprises:
    a first processing sub circuitry, configured to expand a header field, a header field value or a method of the SIP signaling message, so that the SIP signaling message comprises information of modifying the charging method; and
    a first transmitting sub circuitry, configured to transmit the SIP signaling message processed by the first processing sub circuitry to the network side.

* * * * *